(12) United States Patent
Ornella et al.

(10) Patent No.: US 10,168,076 B2
(45) Date of Patent: Jan. 1, 2019

(54) SUPPORTING STRUCTURE FOR SOLAR PANELS

(71) Applicants: Claudio Ornella, Zoppola (IT); Angelo Ornella, Zoppola (IT)

(72) Inventors: Claudio Ornella, Zoppola (IT); Angelo Ornella, Zoppola (IT)

(*) Notice: Subject to any disclaimer, the term of this patent is extended or adjusted under 35 U.S.C. 154(b) by 114 days.

(21) Appl. No.: 15/302,671

(22) PCT Filed: Apr. 9, 2014

(86) PCT No.: PCT/IT2014/000106
§ 371 (c)(1),
(2) Date: Oct. 7, 2016

(87) PCT Pub. No.: WO2015/155792
PCT Pub. Date: Oct. 15, 2015

(65) Prior Publication Data
US 2017/0045267 A1    Feb. 16, 2017

(51) Int. Cl.
*F24J 2/54*        (2006.01)
*F24S 30/458*    (2018.01)
(Continued)

(52) U.S. Cl.
CPC ........... *F24S 30/458* (2018.05); *F24S 30/452* (2018.05); *F24S 2020/16* (2018.05);
(Continued)

(58) Field of Classification Search
CPC .................... F24J 2/54; F24J 2/38; F24J 2/52
(Continued)

(56) References Cited

U.S. PATENT DOCUMENTS

| 7,192,146 B2 * | 3/2007 | Gross | F24J 2/38 |
| | | | 359/853 |
| 9,182,146 B2 * | 11/2015 | Tamaura | F24J 2/07 |

(Continued)

FOREIGN PATENT DOCUMENTS

| EP | 1698841 A2 | 9/2006 |
| ES | 2300222 A1 | 6/2008 |

(Continued)

OTHER PUBLICATIONS

International Search Report for PCT/IT2014/000106, dated Dec. 4, 2014.
IPRP with Chapter II annexes.

*Primary Examiner* — Gregory Huson
*Assistant Examiner* — Nikhil Mashruwala
(74) *Attorney, Agent, or Firm* — Harness, Dickey & Pierce, P.L.C.

(57) ABSTRACT

A support structure for solar panels is comprised of two or more circular and concentric tracks or rails on which a plurality of pylons are mounted. The pylons are parallel and equipped with support wheels so as to support, through respective frames, a plurality of solar panels. The pylons rotate with respect to the common center of the concentric tracks so as to carry out a rotational movement for the azimuthal tracking (RA) of the sun (from east to west), while a plurality of actuators, which are mounted within each pylon, move one or more panels in order to obtain a rotational movement for the zenithal tracking (RZ). The combination of the two rotations is controlled by an electronic control unit, so as to follow at every moment of the day the sun's position. The support structure may be mounted on poles and can be isolated or can be installed on coverings, building roofs or generic flat surfaces.

9 Claims, 8 Drawing Sheets

(51) Int. Cl.
   *F24S 30/452*    (2018.01)
   *F24S 30/00*     (2018.01)
   *F24S 20/00*     (2018.01)

(52) U.S. Cl.
   CPC ......... *F24S 2030/145* (2018.05); *Y02B 10/20* (2013.01); *Y02E 10/47* (2013.01)

(58) Field of Classification Search
   USPC ........................................ 126/600, 425, 605
   See application file for complete search history.

(56) References Cited

U.S. PATENT DOCUMENTS

| | | | |
|---|---|---|---|
| 9,285,139 B2* | 3/2016 | Page | F24S 23/81 |
| 9,404,677 B2* | 8/2016 | Sankrithi | F24S 30/425 |
| 9,471,050 B2* | 10/2016 | Tilley | G05B 15/02 |
| 9,477,065 B1* | 10/2016 | Baker | G02B 7/183 |
| 2009/0250095 A1* | 10/2009 | Thorley | F24J 2/085 |
| | | | 136/246 |
| 2010/0012113 A1 | 1/2010 | Martin Barbero | |
| 2010/0307479 A1* | 12/2010 | Park | F24J 2/38 |
| | | | 126/601 |
| 2011/0017276 A1* | 1/2011 | Boffa | F24J 2/542 |
| | | | 136/246 |
| 2011/0168232 A1* | 7/2011 | Gibson | F24J 2/38 |
| | | | 136/246 |
| 2011/0220091 A1* | 9/2011 | Kroyzer | F24J 2/38 |
| | | | 126/572 |
| 2015/0377518 A1* | 12/2015 | Maxey | F24J 2/38 |
| | | | 126/714 |
| 2016/0020725 A1* | 1/2016 | Miyahara | H02S 20/32 |
| | | | 136/246 |
| 2016/0161151 A1* | 6/2016 | Wissenz | F03G 6/06 |
| | | | 126/714 |
| 2018/0062572 A1* | 3/2018 | Kunesh | H02S 30/20 |
| 2018/0076757 A1* | 3/2018 | Gross | H02S 20/32 |

FOREIGN PATENT DOCUMENTS

| | | |
|---|---|---|
| ES | 2301430 A1 | 6/2008 |
| ES | 2352767 A1 | 2/2011 |
| GR | 1007242 B | 4/2011 |
| WO | WO-2010/102256 A2 | 9/2010 |
| WO | WO-2013/046999 A1 | 4/2013 |

* cited by examiner

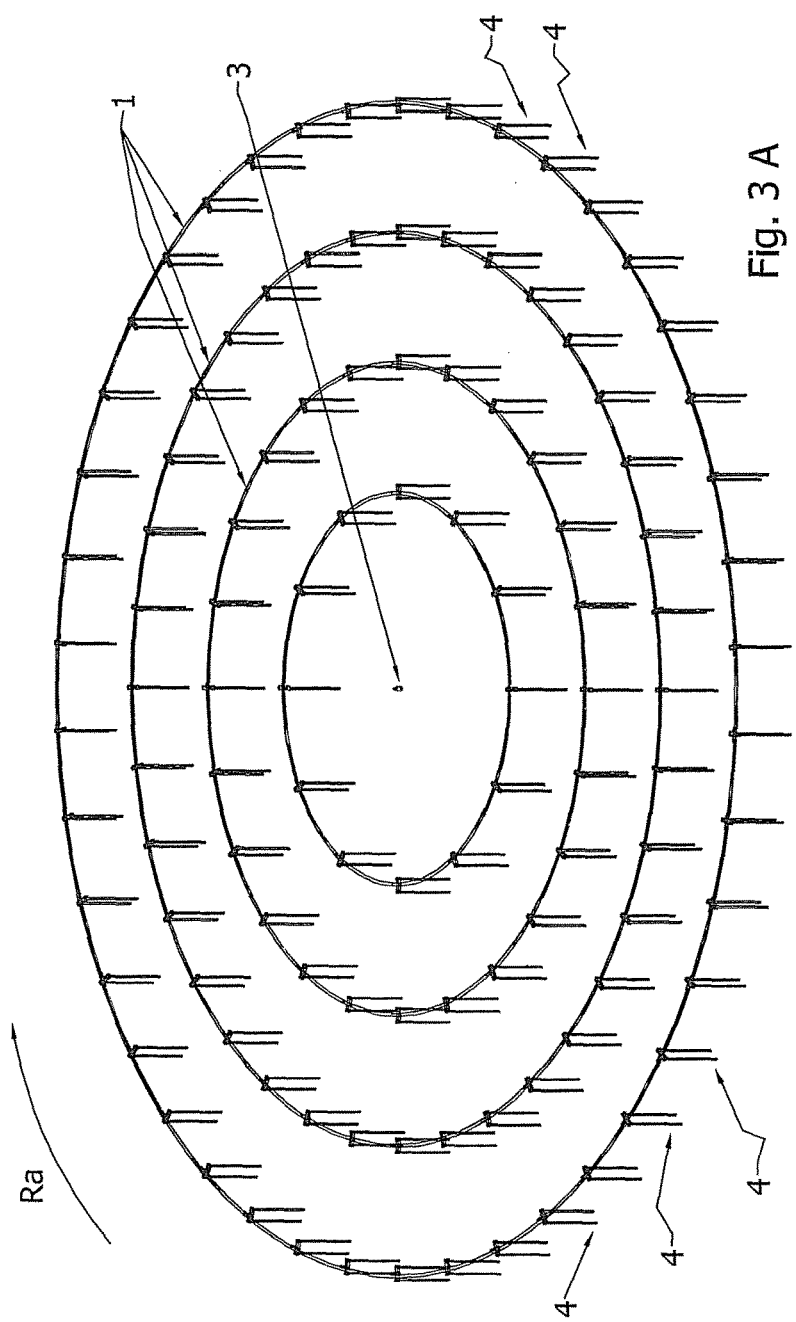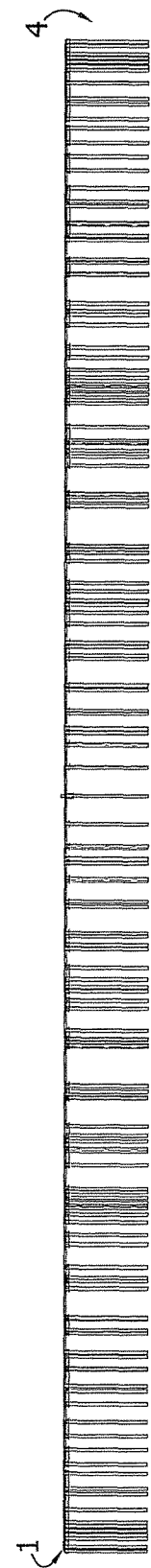
Fig. 3 A
Fig. 3 B

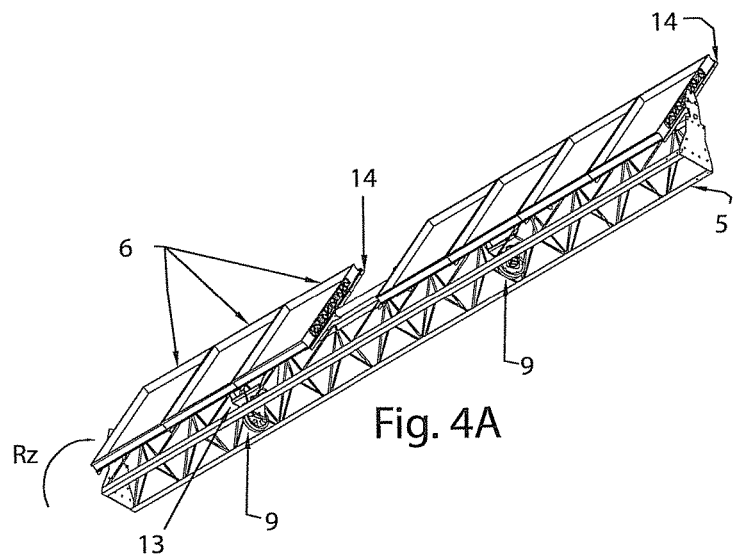
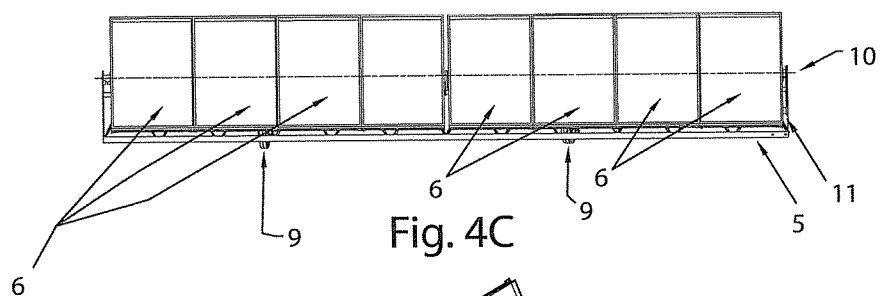
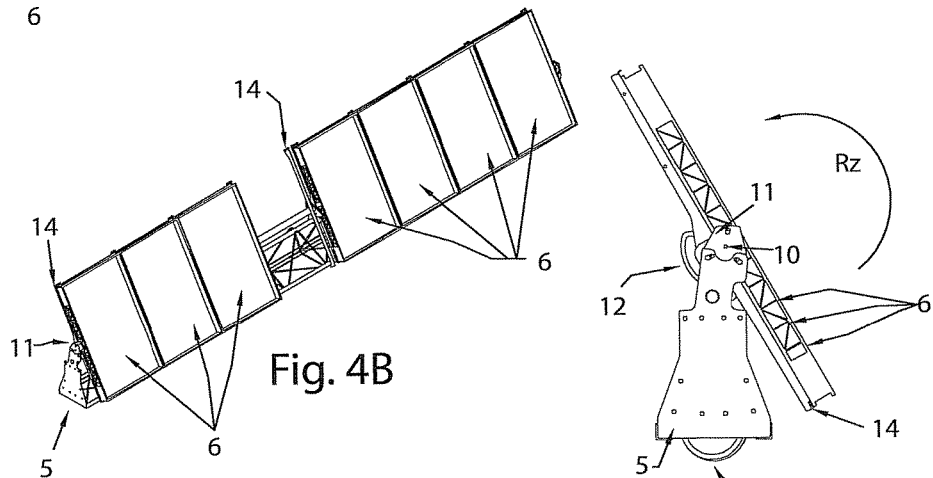
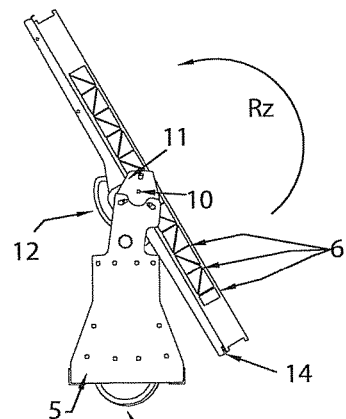
Fig. 4A
Fig. 4C
Fig. 4B
Fig. 4D

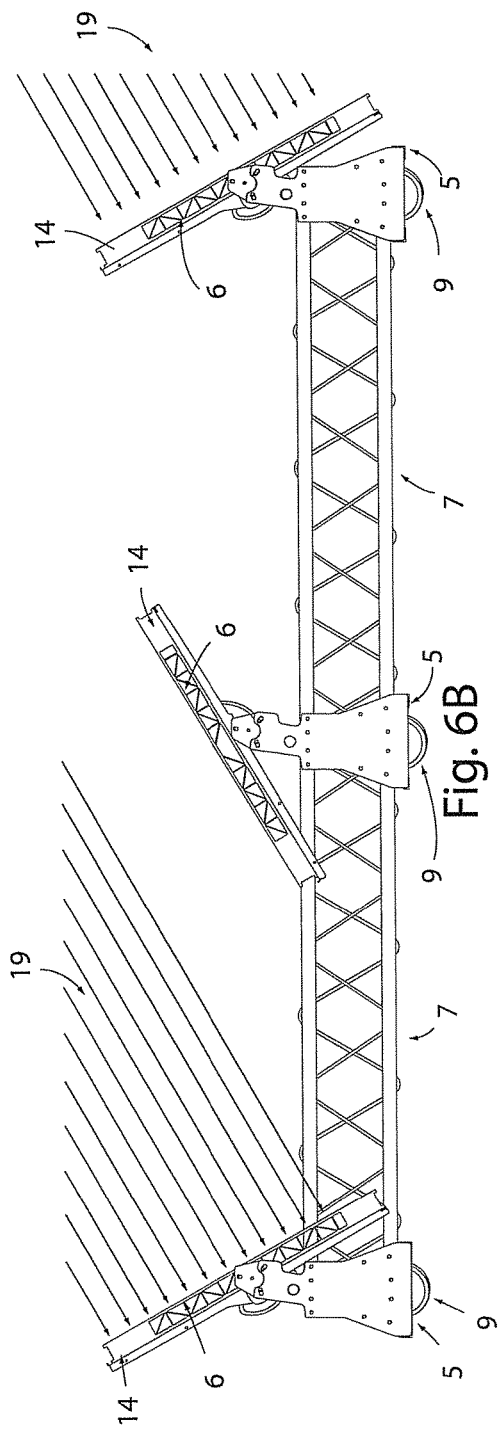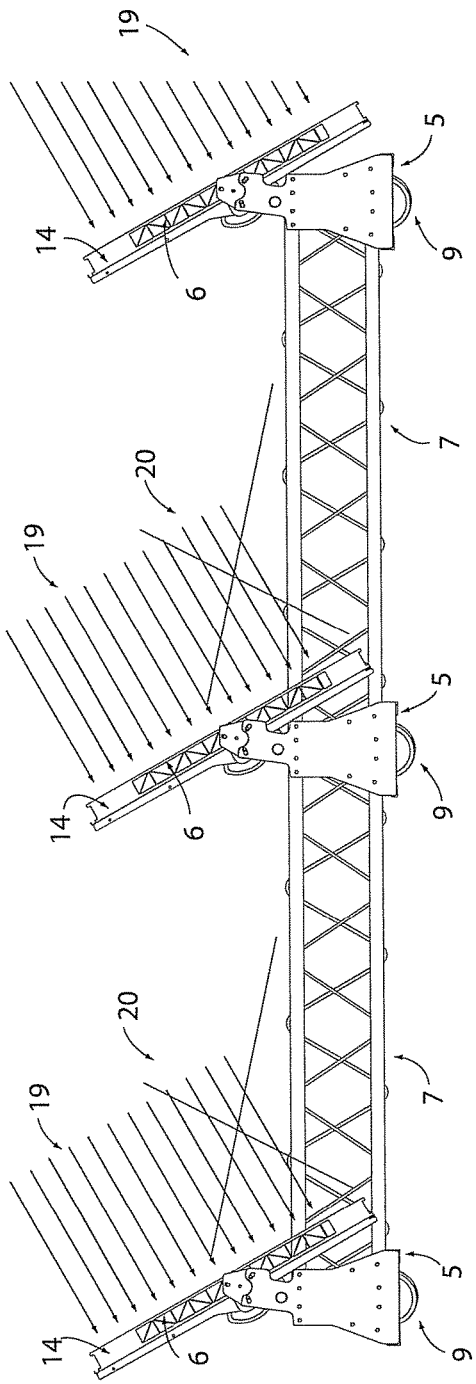

SUPPORTING STRUCTURE FOR SOLAR PANELS

CROSS REFERENCE TO RELATED APPLICATIONS

This application is a National Stage of International Application No. PCT/IT2014/000106, filed Apr. 9, 2014. The entire disclosure of the above application is incorporated herein by reference.

The present invention generally relates to a structure for supporting solar panels and more particularly the invention relates to a support structure with variable geometry, which is able to move the solar panels as sun followers during the day and during the year; furthermore, the support structure can be mounted on poles, as an isolated structure, or used as a cover, such as a roof of buildings or a roof of greenhouses, or installed on roundabouts or other circular-shaped surfaces.

Currently, structures for supporting solar panels (the so-called solar trackers) are constituted by a central pillar on which a "sail" consisting of modular panels lying on the same plane is engaged.

Moreover, the central pillar is connected to a slewing ring that provides for the azimuthal movement, from east to west, of the whole structure, while a hinge, which is placed on the horizontal axis of the "sail", provides for the zenithal movement from 0 to 90°.

Said known support structure is extremely cumbersome when many solar panels are installed and causes significant shading if there are more rows of solar trackers; moreover, each solar tracker, as described, cannot be used as a cover or roof for buildings.

The above mentioned structure, on one hand, has good features of scalability for industrial production, but, on the other hand, it needs a lot of space in order that the adjacent solar trackers do not cause unwanted shading.

Furthermore, the ratio between the installed electrical power and the total surface of the structure is very high, while the ratio between the installed electrical power and the employed means, both in terms of energy needed for making the whole structure and in terms of materials constituting said structure itself (such as the steel required to build a solar tracker, the cement to perform foundations of the electrical connections, the employed workers, etc.), is very low.

Finally, the surface which is occupied by said known supporting structure is related to the specific solar tracker and it cannot be used for any other human activity; it follows that, when the size of the single solar tracker becomes greater, the whole supporting structure becomes more cumbersome and the angular tracking becomes less accurate, as well as the visual impact increases (said visual impact is constituted from a real stretch of pillar trackers, the so-called "solar parks").

An object of the present invention is therefore to overcome the above mentioned drawbacks and, in particular, to provide a support structure for solar panels with reduced overall dimensions, with respect to the known support structures having the same number of solar panels.

Another support structure for supporting solar panels having the technical features of the appended claim 1 is known from WO 2010/102256 A2.

Another object of the present invention is to provide a support structure for solar panels, which is able to reduce shadowing during its operation, with respect to the known solar trackers.

Another object of the present invention is to provide a support structure for solar panels, which can be used as a roof for covering buildings or flat surfaces in general and that it can also be mounted on poles.

A further object of the present invention is to provide a support structure for solar panels, which is suitable for reducing the environmental and visual impact and which is however efficient and functional from the point of view of the energy efficiency.

These and other objects are achieved by a support structure for solar panels according to the appended claim 1; other technical characteristics of the support structure for solar panels, according to the present invention, are also mentioned in the other dependent claims.

Advantageously, the support structure according to the present invention includes at least two tracks or rails having a circular geometry and concentric to each other, which constitute the path around which a plurality of pylons supporting the solar panels rotate, so that said panels can make an azimuthal tracking of the solar radiation.

According to preferred embodiments of the invention, the structures are made of metal, but nothing prevents the use of different materials, especially building materials, while the tracks or rails can also be placed at a certain height from the ground and in a space devoid of shading.

Modular solar panels (which can be constituted by photovoltaic and/or thermal panels) can be provided; said solar panels are also placed inside special frames consisting of metal supports which are hinged to a carrying rectilinear pylon.

It is possible to check the zenithal tracking (zenithal azimuthal rotation) by using suitable actuators of the panels frames, so as to achieve a correct tracking of the solar radiation, that is to say said solar radiation always hits the panel according to a direction which is perpendicular to said panel; in particular, the movements of each panel are controlled by an electronic control unit, which instantly controls the position of each panel and keeps said position so that the direction of the solar radiation is always perpendicular to the surface of the panel, thus maximizing the energy capture.

Said electronic control unit also controls the weather conditions so as to always place the pylons supporting the panels in a position of low resistance (for example in case of wind or rain events).

Therefore, it is possible to maintain the tracking of a plurality of pylons, thus obtaining a higher energy efficiency (of about 30-35%) with respect to a fixed solar panel.

Preferably, an electronic control unit is provided for controlling the two axial movements of each panel, namely the azimuthal movement (rotation around the track) and the zenithal movement (rotation along the hinge axis of each frame supporting the related panel); a movement of the panels which is properly combined and controlled along the above mentioned axes, throughout the day, allows tracking the different positions of the sun so that the solar radiation always hits the panel in conditions of maximum energy efficiency.

The structure may be mounted isolated or it can form the cover of a building or it can be mounted on existing buildings with a flat roof.

These and other technical features will be more clear from the following description, which refers to preferred embodiments of the support structure for solar panels, according to the present invention, as well as from the enclosed drawings, which also refer to said preferred embodiments of the invention, in which:

FIG. 3A shows a perspective view of a plurality of fixed support tracks, which are included in the support structure of the panels, according to the present invention;

FIG. 3B shows a side view of the support structure of FIG. 3A, according to the present invention;

FIG. 4A shows a first perspective view of one of the support pylons of the solar panels of FIG. 2, according to the invention;

FIG. 4B shows a further perspective view of the support pylon of FIG. 4A, according to the present invention;

FIG. 4C shows a front view of the support pylon of FIGS. 4A and 4B, according to the present invention;

FIG. 4D shows a side view of the support pylon of FIGS. 4A, 4B and 4C, according to the present invention;

FIG. 6A shows a first mode of operation of the solar panels mounted on the support pylons of FIGS. 4A, 4B, 4C and 4D;

FIG. 6B shows a mode of operation of the solar panels mounted on the support pylons of FIGS. 4A, 4B, 4C and 4D, according to the invention;

Figure 1:
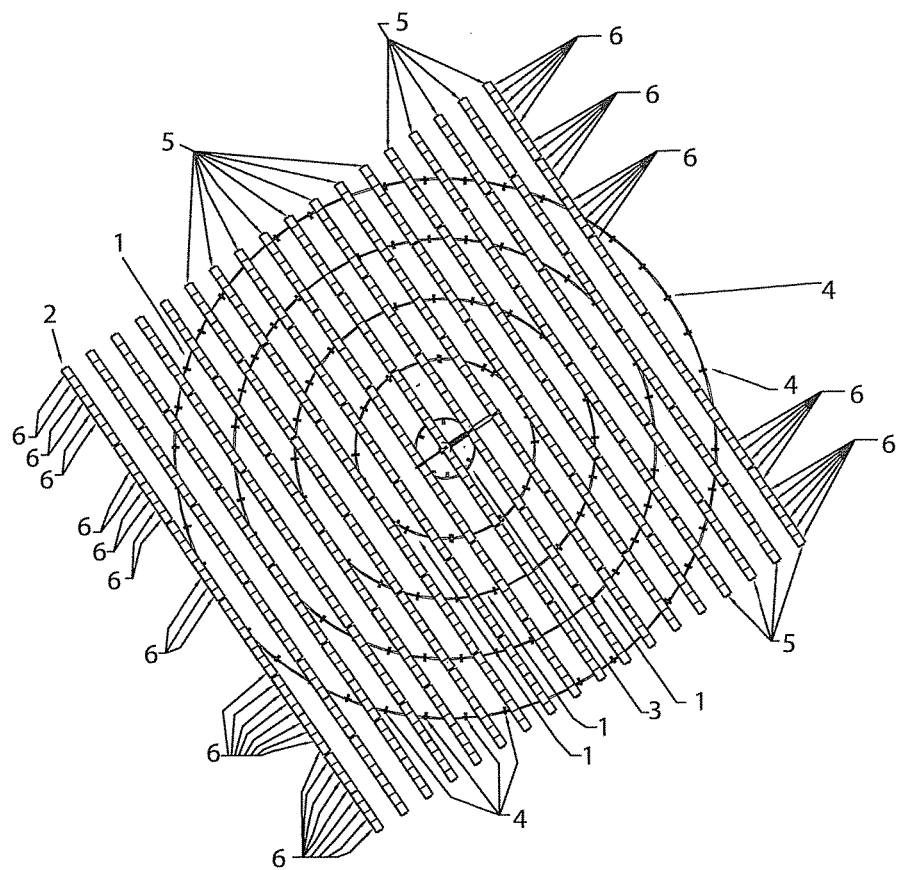
FIG. 1 shows a top plan view of a first embodiment of the support structure for solar panels, according to the present invention, in a first mode of operation.

With reference to the above mentioned figures, the support structure for solar panels according to the present invention comprises a plurality of (and preferably two or more) concentric tracks or rails 1, with a circular geometry or with a polygonal geometry which can be approximated to a circular geometry, which are fixed to the ground or to a generic supporting surface through pilings 4, and a plurality of pylons 5, which are connected to related frames 14 supporting a plurality of solar panels 6 (FIG. 1).

Figure 2:
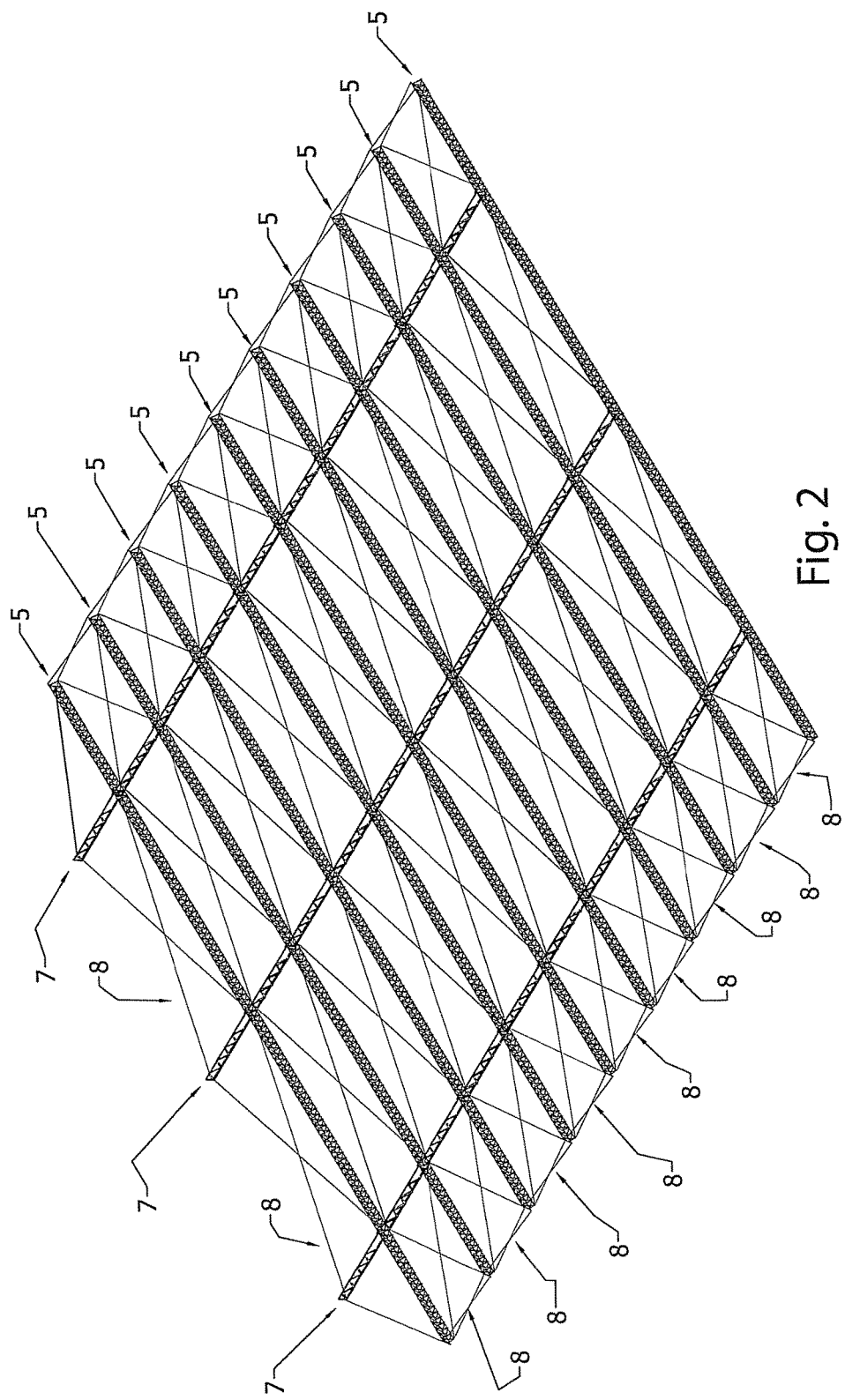
FIG. 2 shows a perspective view of a movable frame, which includes the support pylons of the solar panels and which comprises the support structure of the panels, according to the present invention.
Figure 5:
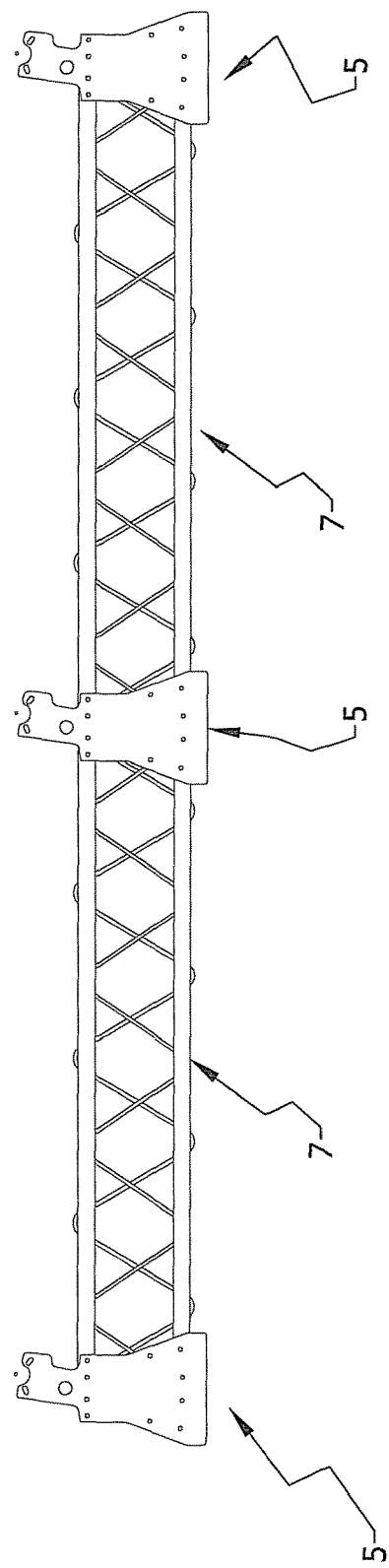
FIG. 5 shows a front view of a system for connecting the support pylons, according to the present invention.
Figure 7:
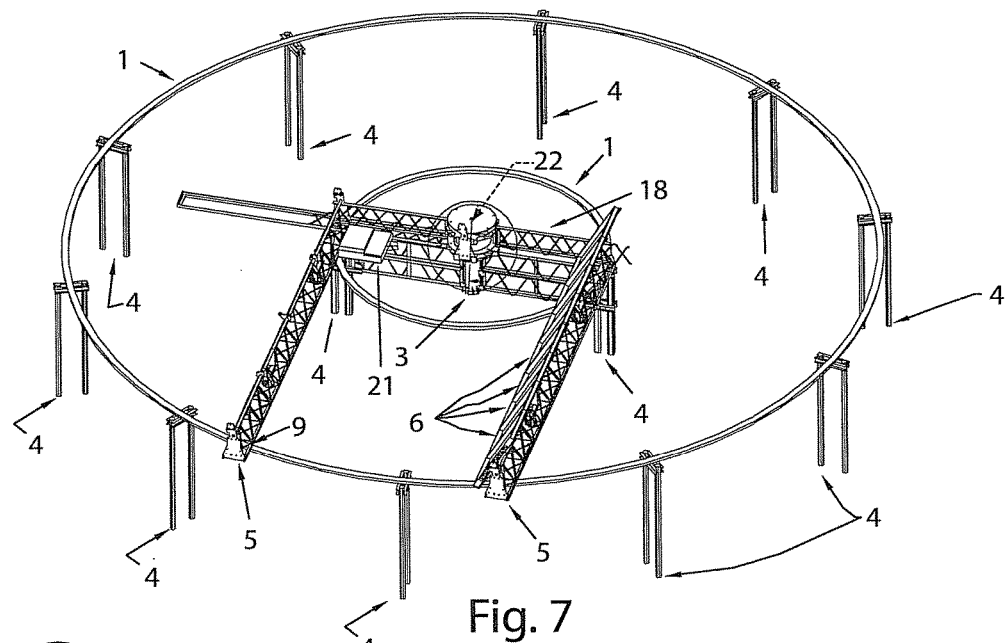
FIG. 7 shows a partial perspective view of the support structure for solar panels, according to the present invention.
Figure 7A:
FIGS. 7A, 7B, 7C show enlargements of technical details of FIG. 7, according to the present invention.
Figure 7B:
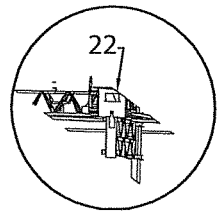
Figure 7C:
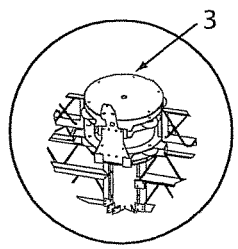
Figure 8:
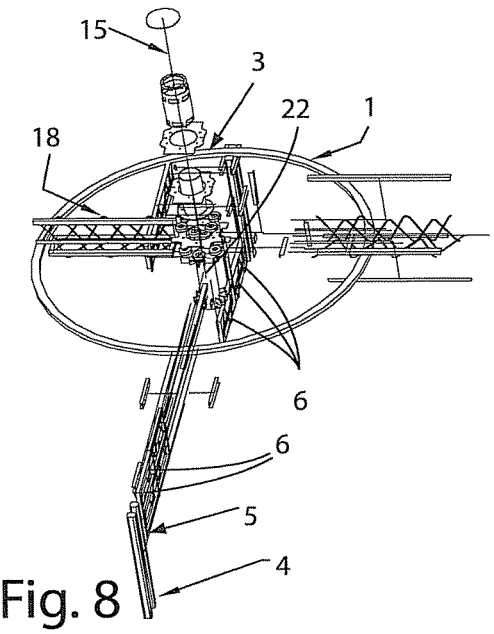
FIG. 8 shows an exploded view of an enlarged detail of FIG. 7, according to the present invention.
Figure 9A:
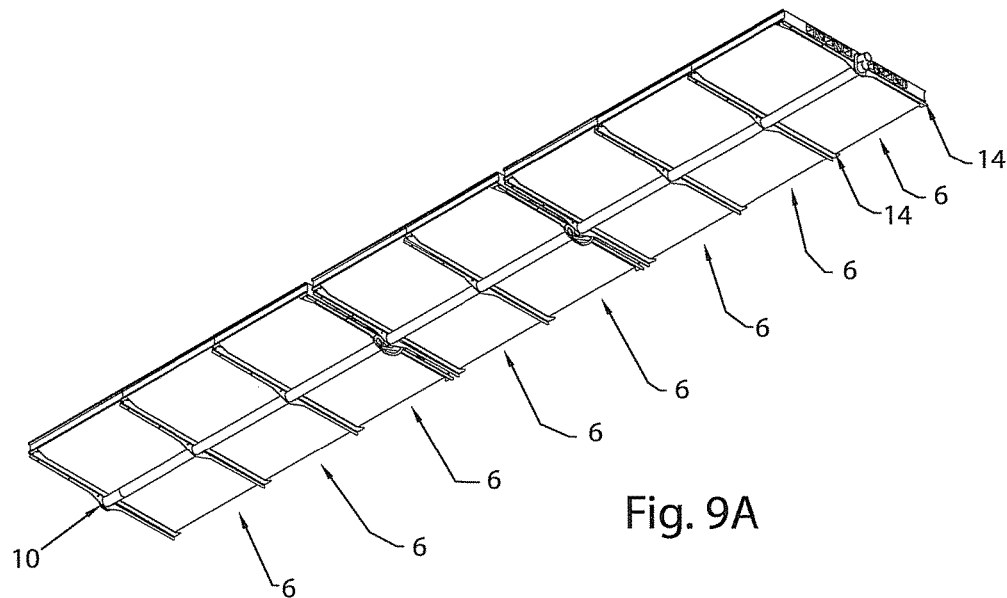
FIG. 9A shows a perspective view of a support frame of the solar panels, which is mounted on the pylon of FIGS. 4A, 4B, 4C, 4D, according to the present invention.
Figure 9B:
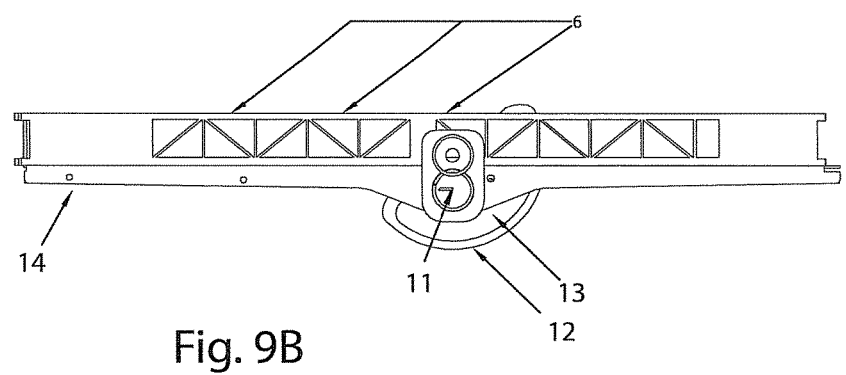
FIG. 9B shows a side view of the support frame of FIG. 9A, according to the present invention.
Figure 9C:
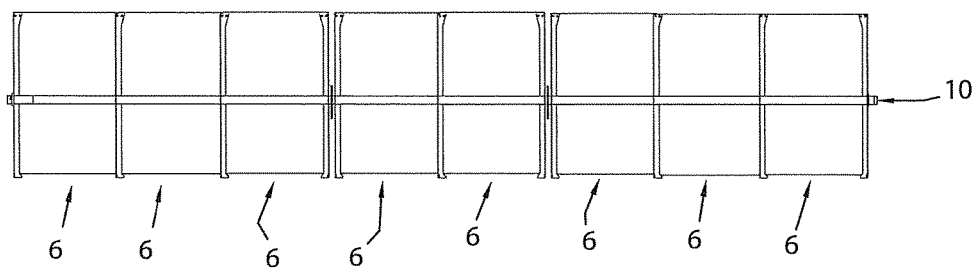
FIG. 9C shows a plan view of the support frame of FIGS. 9A and 9B, according to the present invention.

The pylons 5 are bound to the tracks or rails 1 and move on said tracks 1 through drive wheels 9; furthermore, the pylons 5 are connected together by means of perpendicular or vertical trusses 7, which form a braced frame 8 with said pylons 5 (FIG. 2).

Therefore, the whole movable structure formed by the pylons 5 and the trusses 7 rotates around a central bearing or node 3, which houses an electronic control unit 22, which controls the whole support structure and which is connected to the pylons 5 via a connecting frame 18 (FIGS. 3A, 3B, 5, 7, 8).

In particular, the appended FIG. 1 shows a plan view of one embodiment of the support structure for solar panels according to the present invention, which comprises a fixed portion, constituted by four circular tracks 1 resting on the foundation pilings 4, and a movable portion, constituted by the metallic structures of the pylons 5, on which the frames 14 supporting the solar panels 6 are mounted, which rotate around the central bearing 3. The azimuthal rotation of the movable portion occurs through the drive wheels 9, which rest on the circular rails or tracks 1 and which are linked to the pylons 5 through suitable support means 13, while the zenithal rotation of the structure occurs around an hinge axis or pin 10, by means of suitable chain actuators 11, which move a particular eccentric kinematism 12 (FIGS. 4A, 4B, 4C, 4D, 9A, 9B, 9C).

It follows that the whole movable portion formed by the pylons 5 rests, through the drive wheels 9, on the circular tracks or rails 1 and rotates around the central axis 15 of the bearing 3, where, through a four-way junction, it is possible to connect the pylons 5; therefore, the solar panels 6 rotate either according to an azimuthal direction (around the central bearing or node 3) and according to a zenithal direction (around the hinge axis or pin 10).

An adjustment of the alignment between the rails 1 along a vertical plane is performed by means of a control system for controlling the height of said rails 1 over the foundation pilings 4, while an inverter 21 is installed in a symmetrical central position of each pylon 5; the electrical connecting cables run along the vertical trusses of the frame 18 to connect the central node 3, inside of which the electronic control unit 22 is installed.

FIGS. 6A and 6B show the anti-shadowing function of the support structure according to the invention; without the anti-shadowing function (FIG. 6A), the solar radiation 19 would be able to hit only the first pylon 5 of the solar panels 6, while the back pylons 5 would be only partially hit and would be covered by the shadow 20 generated from the first pylon 5, while the structure according to the invention allows rotating one or more frames 14 mounted on pylons 5 (which would generate the shadow 20) according to the opposite direction with respect to the zenithal direction, thus leaving the solar radiation 19 hits the whole surface of the solar panels 6, which are provided inside the frames 14 of the back pylons 5 (FIG. 6B).

The operation mode of the support structure for solar panels, which is the object of the present invention, is substantially the following.

The movable portions or structures rest on the rails 1 and said rails 1 constitute the path around which the pylons 5, which are able to support the frames 14 where the solar panels 6 are mounted, rotate; said rotation occurs by means of coated drive wheels 9, in order to realize the azimuthal tracking RA (from east to west) of the solar radiation 19.

The movable structures described in the embodiment of the present invention are made of metal, however nothing prevents the use of different materials, such as buildings materials; furthermore, the movable structures are preferably placed at a certain height from the ground over a surface or area without shadowing.

The solar panels (which are constituted by photovoltaic or thermal panels) are placed inside special frames 14, which are constituted of metal support means hinged to the carrying structure of the respective pylon 5, while suitable actuators (the inverters 11, 21) control the zenithal tracking RZ of all the panels 6 which are mounted on a respective pylon 5, so as to perform the tracking function of the solar radiation 19 and the solar radiation 19 is able to hit each panel 6 according to a direction which is perpendicular to the surface of the panel 6 (this is the condition according to which an optimum energy efficiency is performed).

Therefore, the frame 14 contains a plurality of solar panels 6, such as modular panels, and the actuators 11, 21 control the solar tracking by controlling the azimuthal rotation RA and the zenithal rotation RZ.

Said two rotations are needed in order to ensure that the panels 6 carried out an optimum tracking of the solar radiation 19 for any position of the sun; in particular, the tracks or rails 1 constitute the fixed portion of the support structure which, according to the invention, behaves as a large bearing around which the whole movable portion of the structure rotates, by leaning on the rails 1 through the coated wheels 9; moreover, the wheels 9 can be constituted by simple support wheels for distributing the load and/or drive wheels.

The pylons 5, besides having the wheels 9 incorporated, are made so that the respective frames 14, which carry the panels 6, are able to rotate around the hinge axis or pin 10; it is also to be noted that every single pylon 5, when moves according to the zenithal rotation, is independent with respect to the other pylons, so as to control with great accuracy the angular tracking and to reduce the shading of the adjacent pylons 5.

In fact, when the solar radiation 19 is oriented at angles less than 25° with respect to the horizon, the pylons 5 which receive said radiation 19 also shade the pylons 5 that are positioned behind them and therefore, according to the present invention, the electronic unit control 22, according to the sun's position, shall decrease the shading by rotating the frames 14 of the panels 6 in a direction opposite to the direction of the solar tracking, so as to obtain the least possible shading for solar panels 6 which are positioned immediately behind the panels 6 which directly receive the solar radiation 19.

Suitable actuators 21 are provided for said rotation, so as to allow the zenithal tracking and to make angular rotations with angles greater than 90°.

Therefore, the azimuthal and zenithal rotations RA, RZ allows a complete tracking of the sun's trajectory throughout the day for any position of the tracker.

The movements are then controlled for each single pylon 5 by the electronic control unit 22, which instantly controls the position of each panel 6 and keeps said position, so that the solar radiation 19, which hits the panel 6, is always perpendicular to the surface of the solar panel 6, in order to maximize the energy production, also limiting the shading of the other pylons 5.

The electronic control unit 22 controls the weather conditions, so as to move the pylons 5 supporting the panels 6 among positions in which a minimum resistance to the wind is provided, and is also able to control one or two types of drive wheels 9, which are independent of each other since the connection between the wheels 9 and the traction axis occurs through a free wheel; in particular, when a first type of wheel 9 is used for the azimuthal rotation throughout the day, according to the latitude of the place where the structure is installed, the other type of wheels 9 cannot be used, given the presence of the free wheel, while the other wheels 9 are always used for the azimuthal rotation, but shall perform the quick services of movement, such as the fast return of the structure for a new collimation, the maintenance of the structure and/or other needs, thus avoiding that the time during which the tracker returns to the starting position is equal to the tracking time (which is equal to about 8/10 hours).

Moreover, said different types of wheels turn at different speeds between them to facilitate the rebooting.

In particular, the support structure according to the invention is able to maintain the tracking of a plurality of pylons 5 with frames 14 containing solar panels 6, in which case the yield is greater than 30-35% with respect to a fixed solar panel.

Finally, the structure, which has a uniform load distribution over the entire surface, can be mounted isolated outside, thus allowing cultivation below the structure, or can be installed on existing buildings with a flat layer (such as flat roofs or greenhouses), or it can be provided for covering a building, in order to considerably decrease with respect to the known structures, the environmental impact.

The support structure also allows the maintenance of failure solar panels without blocking the operation of the other panels.

From the above description, the technical features of the support structure for solar panels, according to the present invention, are clear, as well as the related advantages.

Finally, it is also clear that other variations of the invention may be implemented without departing from the inventive idea which is mentioned in the appended claims, as well as it is clear that the technical details which have been described and illustrated may be varied according to requirements and without departing from the scope of protection of the appended claims.

The invention claimed is:

1. A support structure for solar panels, comprising at least two concentric tracks or rails having a circular geometry which are fixed to a supporting surface through foundation piles and a plurality of pylons, which are connected to related frames containing a plurality of solar panels and which are connected together by means of perpendicular trusses which form a braced frame with said pylons, said pylons being bound to said tracks or rails and moving on said tracks or rails through drive wheels which rest on said tracks or rails and which are linked to said pylons through support means, so that said pylons and said trusses rotates around a central bearing or node, an electronic control unit, controlling said support structure, said solar panels being thus free to spatially rotate according to an azimuthal direction (RA) around said central bearing or node through said drive wheels and being free to spatially rotate according to a zenithal direction (RZ) around a hinge axis or pin, which is placed centrally and longitudinally on each frame containing said solar panels, wherein said solar panels which are installed on a frame of a respective pylon are rotated in the opposite direction with respect to the solar panels which are installed on the frames of the adjacent pylons of the support structure.

2. The support structure as claimed in claim 1, wherein said electronic control unit is housed in the central bearing or node and is connected to said pylons via a connecting frame.

3. The support structure as claimed in claim 1, wherein said electronic control unit controls respective actuators and/or kinematic mechanisms, which are able to rotate said pylons on said tracks or rails and to spatially rotate said solar panels of each frame according to said zenithal direction (RZ), said electronic control unit being also able to instantly control the positions of each solar panel, so that the solar radiation which hits each solar panel is always perpendicular to the surface of said solar panel.

4. The support structure as claimed in claim 1, wherein said electronic control unit monitors the weather conditions, so as to place said pylons in positions of minimal resistance to the wind.

5. The support structure as claimed in claim 1, wherein that said solar panels which are installed on a fixed frame of a respective pylon are rotated according to said zenithal direction (RZ) independently with respect to the solar panels which are installed on the frames of the other pylons of said support structure.

6. The support structure as claimed in claim 1, wherein said solar panels are constituted by modular solar panels.

7. The support structure as claimed in claim 1, wherein said panels are selected from solar panels and/or photovoltaic panels and/or thermal panels.

8. The support structure as claimed in claim 1, wherein said drive wheels are of at least two different types and independent between them, so that when a first type of wheels is used for an azimuthal rotation of tracking, a second type of wheel, which is also used for said azimuthal rotation, performs a fast return of the structure for a new collimation.

9. The support structure as claimed in claim 8, wherein said different types of wheels turn at different speeds.

* * * * *